United States Patent Office 2,721,867
Patented Oct. 25, 1955

2,721,867
QUINOLINE COMPOUND

Charles F. Geschickter, Kensington, and Leonard M. Rice, Baltimore, Md.

No Drawing. Application September 3, 1953,
Serial No. 378,422

3 Claims. (Cl. 260—253)

The present invention relates to quinoline compounds for therapeutic use.

Application for United States Letters Patent Serial No. 251,980, filed October 18, 1951, and Serial No. 378,420, filed concurrently herewith, which is a continuation-in-part of Serial No. 251,980, describe and claim certain quinoline derivatives for use in the treatment of asthma, hay fever and similar allergic diseases. The compounds described in those applications are effective but we have found that certain quinoline salts are more effective due to the fact that they are more readily absorbed in the body and have a longer and more accumulative effect.

One of the objects of the present invention is therefore to provide new and improved quinoline salts which are readily absorbed in the body.

Another object is to provide quinoline salts which have a long and accumulative therapeutic effect.

The salts we have found to be particularly advantageous are the theophylline, quininic acid and certain amate salts of 6-methoxy-4 (dimethylaminoethylamino) quinoline. These salts may be readily prepared as follows:

*Preparation of the theophylline salt of 6-methoxy-4 (dimethylaminoethylamino) quinoline*

A mixture of 29.6 grams of theophylline and 24.5 grams of 6-methoxy-4 (dimethylaminoethylamino) quinoline are dissolved in 200 ml. of dry acetone. The solution after filtering is transferred to a 3-liter container and the acetone is removed under reduced pressure. After most of the acetone has been removed, the last traces are removed under high vacuum. The residue is powdered, re-dissolved in alcohol, from which it is obtained as a crystalline salt.

*Preparation of the amate salt of 6-methoxy-4 (dimethylaminoethylamino) quinoline*

A mixture of 45.5 grams (0.2 mol) of N,N diethyl cistetrahydrophthalamic acid and 24.5 grams (0.1 mol) of 6-methoxy-4 (dimethylaminoethylamino) quinoline are dissolved in 200 ml. (a convenient quantity) of dry acetone. The solution, after filtering is transferred to a 3-liter container and the acetone removed under reduced pressure. After most of the acetone has been removed the last traces are removed under high vacuum (less than 0.1 mm.). The residue is loosely powdered, transferred to a mortar, and finely powdered. The product is an almost white, free flowing, hydroscopic powder.

*4-(dimethylaminoethylamino)-6-methoxyquinoline salt of quininic acid*

A mixture of 2.45 gm. of 4-dimethylamino-ethylamino-6-methoxy quinoline and 4.06 gm. of quinic acid is heated at reflux with 35 cc. of dry acetone. Methanol (anhydrous) is added to the boiling solution until the material just dissolves. The solution is boiled an additional several minutes and filtered. The solution is allowed to come to room temperature and diluted to permanent turbidity with anhydrous ether. Upon standing in the ice box for several hours there is obtained 5 gm. of the salt (77%) in the form of needles which after filtration and drying melts at 162–163. The salt dissolves in water giving an almost neutral solution.

The salts have low toxicity and in tests on rats and mice, the LD 50 of the theophylline salt is 100 mg./kilo while that of the amate is 300 mg./kilo.

The salts may be administered orally or by injection and for oral administration, 50 mg. capsules may be given once or twice daily.

The salts may also be dissolved in water, benzyl alcohol and dioctyl solution, usually about 100 to 120 mg. per cc. and may be administered intramuscularly. About ½ cc. may be injected daily for one week and then every other day or weekly as indicated.

The salts are not excreted from the body as fast as they are absorbed so that the effects are long and cumulative.

From the foregoing it will be apparent that the objects of the invention are attained and new and improved quinoline salts have been provided. Various modifications may of course be made without departing from the spirit of the invention or the scope of the appended claims.

What is claimed and desired to be secured by United States Letters Patent is:

1. As a new composition of matter the 4-dimethylamino-ethylamino-6-methoxyquinoline salt of a member of the group consisting of theophylline and quininic acid.

2. The theophylline salt of 6-methoxy-4 (dimethylaminoethylamino) quinoline.

3. 4-(dimethylaminoethylamino) - 6 - methoxyquinoline salt of quininic acid.

No references cited.